US012190161B1

United States Patent
Kerr et al.

(10) Patent No.: US 12,190,161 B1
(45) Date of Patent: Jan. 7, 2025

(54) SECURITY INCIDENT AND EVENT MANAGEMENT CASE CREATION SYSTEM AND METHOD

(71) Applicant: MORGAN STANLEY SERVICES GROUP INC., New York, NY (US)

(72) Inventors: Alec R. Kerr, Tuscaloosa, AL (US); Joseph Edmonds, Ellicott City, MD (US)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 0 days.

(21) Appl. No.: 18/794,248

(22) Filed: Aug. 5, 2024

(51) Int. Cl.
    *G06F 9/50* (2006.01)
    *G06F 21/55* (2013.01)

(52) U.S. Cl.
    CPC .......... *G06F 9/5027* (2013.01); *G06F 21/554* (2013.01)

(58) Field of Classification Search
    None
    See application file for complete search history.

(56) References Cited

U.S. PATENT DOCUMENTS

| | | | |
|---|---|---|---|
| 8,782,784 B1 | 7/2014 | Bruskin | |
| 8,874,550 B1* | 10/2014 | Soubramanien | G06F 21/00 707/731 |
| 8,904,531 B1* | 12/2014 | Saklikar | H04L 63/1416 726/25 |
| 9,064,210 B1 | 6/2015 | Hart | |
| 9,069,930 B1 | 6/2015 | Hart | |
| 9,282,114 B1* | 3/2016 | Dotan | G06F 21/577 |
| 9,601,000 B1* | 3/2017 | Gruss | G06F 21/552 |
| 10,049,220 B1 | 8/2018 | Hatsutori et al. | |
| 10,333,948 B2* | 6/2019 | Rostamabadi | H04L 63/1416 |
| 10,404,751 B2* | 9/2019 | Rajkumar | H04L 63/1408 |
| 10,681,060 B2* | 6/2020 | Scheidler | G06N 20/00 |
| 11,494,488 B2* | 11/2022 | Syed | G06F 21/577 |
| 11,621,970 B2* | 4/2023 | Soliman | G06N 3/08 726/23 |
| 11,818,156 B1 | 11/2023 | Parikh et al. | |
| 2015/0163242 A1 | 6/2015 | Laidlaw et al. | |
| 2018/0077183 A1* | 3/2018 | Swann | H04L 63/1425 |
| 2018/0167402 A1 | 6/2018 | Scheidler et al. | |
| 2018/0288126 A1* | 10/2018 | Smart | H04L 69/22 |
| 2019/0356679 A1* | 11/2019 | Sites | H04L 63/1416 |
| 2020/0042700 A1* | 2/2020 | Li | G06F 21/554 |
| 2020/0186569 A1* | 6/2020 | Milazzo | H04L 63/08 |
| 2021/0110032 A1 | 4/2021 | Yip | |
| 2021/0352136 A1 | 11/2021 | Dojka et al. | |
| 2022/0114252 A1 | 4/2022 | Syed et al. | |
| 2022/0342707 A1 | 10/2022 | Alagna et al. | |

(Continued)

OTHER PUBLICATIONS

Bhatt et al.; "The Operational Role of Security Information and Event Management Systems"; Hewlett-Packard Laboratories; 2014 IEEE; (Bhatt_2014.pdf; pp. 35-41) (Year: 2014).*

(Continued)

*Primary Examiner* — Hiren P Patel (74) *Attorney, Agent, or Firm* — Weitzman Law Offices, LLC (57) ABSTRACT

A method of improving efficiency of processing alerts by a Security Incident & Event Management (SIEM) platform involves a SIEM case creation platform made up of at least one pipeline, made up of multiple tasks, and is interposed between an alerts database and the SIEM platform.

21 Claims, 9 Drawing Sheets

(56) References Cited

U.S. PATENT DOCUMENTS

| | | |
|---|---|---|
| 2022/0343181 A1 | 10/2022 | Thomas |
| 2022/0345479 A1 | 10/2022 | Markonis et al. |
| 2022/0368696 A1* | 11/2022 | Karpovsky ........... H04L 63/102 |
| 2023/0252138 A1* | 8/2023 | McCarthy ............. G06F 21/566 |
| | | 726/25 |
| 2024/0080337 A1* | 3/2024 | Matefi .................. G06F 21/554 |
| 2024/0089293 A1* | 3/2024 | Singla ................ H04L 63/1416 |
| 2024/0256421 A1* | 8/2024 | Alexander .......... G06F 11/3476 |

OTHER PUBLICATIONS

Granadillo et al.; "New types of Alert Correlation for Security Information and Event Management Systems"; IEEE 2016; (Gonzalez_2016.pdf; pp. 1-7) (Year: 2016).*

Granadillo et al.; "Security Information and Event Management (SIEM): Analysis, Trends, and Usage in Critical Infrastructures"; Cybersecurity Unit, Atos Research & Innovation, Spain; https://doi.org/10.3390/s21144759; (Granadillo_2021.pdf; pp. 1-28) (Year: 2021).*

* cited by examiner

SECURITY INCIDENT AND EVENT MANAGEMENT CASE CREATION SYSTEM AND METHOD

FIELD OF THE INVENTION

This disclosure relates generally to computer systems and, more particularly, to Security Incident & Event Management (SIEM).

BACKGROUND

Cyber security threats are getting more and more sophisticated. As a result, the identification of threats is becoming more difficult. In an effort to identify and manage threats, enterprises often employ Security Incident & Event Management (SIEM) systems, for example, Splunk>®, SolarWinds® and ArcSight®, to detect threats and other anomalies. SIEM is a security solution that helps organizations recognize and address potential security threats and vulnerabilities before they can harm business operations. SIEM technology collects event data and identifies activity that deviates from the norm with real-time analysis, and takes appropriate action. Some SIEM systems, for example, TheHive Project and Elastic Kibana® SIEM provide for SIEM case creation, but such systems are fairly rudimentary. More robust systems, such as Splunk>®, SolarWinds® and ArcSight® use a more sophisticated approach to case creation, through allowing certain consolidation of alerts, but, again, the case creation process is still fairly rudimentary in that they have little to no resiliency or ability to recover from failures in the case creation process.

More particularly, the SIEM process collects event data, normalizes and aggregates the collected data into SIEM cases which are then analyzed in seconds to detect potential threats and provide actionable information-a task that is impossible to execute manually, given the speed with which computers operate and the time it takes for a threat to actually manifest and negatively affect business operations.

In addition all such systems rely upon the quality of the alerts that they are dealing with. If anything goes wrong with the alerts, threats can be missed or production processes may need to be re-run with the hope that the same alert will manifest again. Both are problematic for threat hunting and cause significant inefficiencies in the SIEM process.

Accordingly, there remains a need in the art for ways to enhance and improve the ability of SIEM systems to do what they do.

SUMMARY

This disclosure describes solutions that provide significant advances in addressing the aforementioned problems.

One aspect of this disclosure involves a system for improving efficiency of processing alerts by a Security Incident & Event Management (SIEM) platform. The system involves a pipeline coupled to a source of alerts and an SIEM platform, the pipeline including a source task having an input through which it can receive alerts from the source of alerts and an output; at least one process task having an input and an output, wherein the input is coupled to the output of the source task; at least one sink task having an input, coupled to the output of the at least one process task, and an output coupled to the SIEM platform, wherein the at least one sink task is configured to publish cases to the SIEM platform when a count of cases is less than or equal to a count of alerts received by a preceding task; wherein the at least one process task is configured to operate on alerts received via its input and wherein the at least one process task is configured to be skippable in the event an exception occurs in the at least one process task when the at least one process task is operating on at least one alert received via its input.

Another aspect of this disclosure involves a method of improving efficiency of processing alerts by a Security Incident & Event Management (SIEM) platform using a case creation platform. The method involves executing a source task in a pipeline so that it retrieves alerts from a source of alerts; providing an output of the source task to a first of at least two process tasks in the pipeline; processing the output of the source task, using the first of the at least two process tasks and output first processed alerts to a second of the at least two process tasks; processing the first processed alerts with the second of the at least two process tasks such that when the second of the at least two process tasks completes, an output of the second of the at least two process tasks will be provided to a sink task for publication as one or more SIEM cases to the SIEM platform; and when the second of the at least two process tasks fails due to an exception, if the second of the at least two process tasks is skippable, the first processed alerts will be automatically provided to a next task following the second of the at least two process tasks, and at least one object will be stored in an error log relating to the failure; and when the second of the at least two process tasks fails due to the exception, but the second of the at least two process tasks is not skippable, (i) at least one object will be stored in an error log relating to the failure, (ii) associated data will be stored in the task log, and (iii) a notification will be issued regarding the failure, such that a mock out of at least a portion of the pipeline can occur.

Systems and methods employing the teachings herein can have improved performance because it solves the problem of data loss when an error in an alert is encountered. This is significant and improves the processing of the computer(s) implementing the SIEM system because, when analyzing time-framed data from a large set, as is common for SIEM systems, the need to reproduce the exact input data that caused the error is avoided.

Additionally, systems and methods employing the teachings herein can have improved performance due to the provision of granular control, redundancy and a level of monitoring unavailable in the prior art. Thus, by employing the teachings herein, security event prioritization of case creation is improved and allows for fewer and more impactful cases to be provided to an SIEM system.

BRIEF DESCRIPTION OF THE DRAWINGS

This disclosure is further described in the detailed description that follows, with reference to the drawings, wherein the same reference numbers appearing in the various drawings and description designate corresponding or like elements among the different views. and in which.

DETAILED DESCRIPTION

Purely for purposes of general understanding, definitions of some terms are provided, but those definitions are not to be intended to be limiting or narrowing in scope of meaning for purposes of claim interpretation, the full extent of the meaning of these terms is intended.

"Alert" generally refers to a set of {key: value} data points, for example, JavaScript Object Notation (JSON), its supersets, derivatives or alternatives. The {key: value} data points are generated by analytic code, which are relevant to an incident or anomaly that was identified in one or more log sources. All alerts typically contain common keys, for example, analytic_name, analytic_description, unique identifier, timestamp, etc., as well as additionally keys which may be specific to a particular analytic and/or log source, for example, http_url, email_address, ip_address, windows_username, etc.

"Analytic" generally refers to a scheduled job which runs a piece of code on an interval to evaluate recent logs for specific anomalies. Any anomalies found are published as alerts to one or more alerts database(s).

"Observable" generally refers to an important piece of data extracted from an alert and which falls into a particular data_type, for example, a domain, IP address, hostname, username, email_message_id, etc. An alert will typically contain multiple observables under a variety of different key names. For example, an alert may contain the key "sender_email_address" and that key may map to a value containing an email address, whose email address may further include a "domain," for example, gmail.com, {entityname}.com, {school}.edu, etc. Therefore if it contains "gmail.com," that domain is considered a 'domain' observable. An observable also includes a list of tags (strings) indicating which field(s) from the alert contained the observable data. In the foregoing example, the only tag is 'sender_email_address', but, depending upon the circumstances, a domain could be extracted from a different key, such as "http_url" or "recipient_email_address").

Extracting observables makes comparing the contents of alerts and cases simpler.

"SIEM case" generally refers to an object which can be added to a SIEM and analyzed by automated procedures or triage analysts. An SIEM case typically includes metadata fields such as a "title," "description," and "assignment." An SIEM case may also include one or more alerts, all of which are relevant to a specific security incident.

"Pipeline" generally refers to an object which contains a series of tasks. When a pipeline is "run" each task is called sequentially to manipulate/aggregate/filter alert and/or case data. A pipeline publishes SIEM cases (containing one or more alerts) to an SIEM platform.

"Task" generally refers to an object which contains a set of parameters and a "main( )" function. The main( ) function accepts alert/case data as its input, manipulates that data based on the task's parameters, and outputs, typically at least some of the manipulated case/alert data to a subsequent task. However, it is to be understood that, in some instances, the manipulation may yield no data to provide to a subsequent task, either due to an error or as a proper result of the manipulation.

Figure 1:
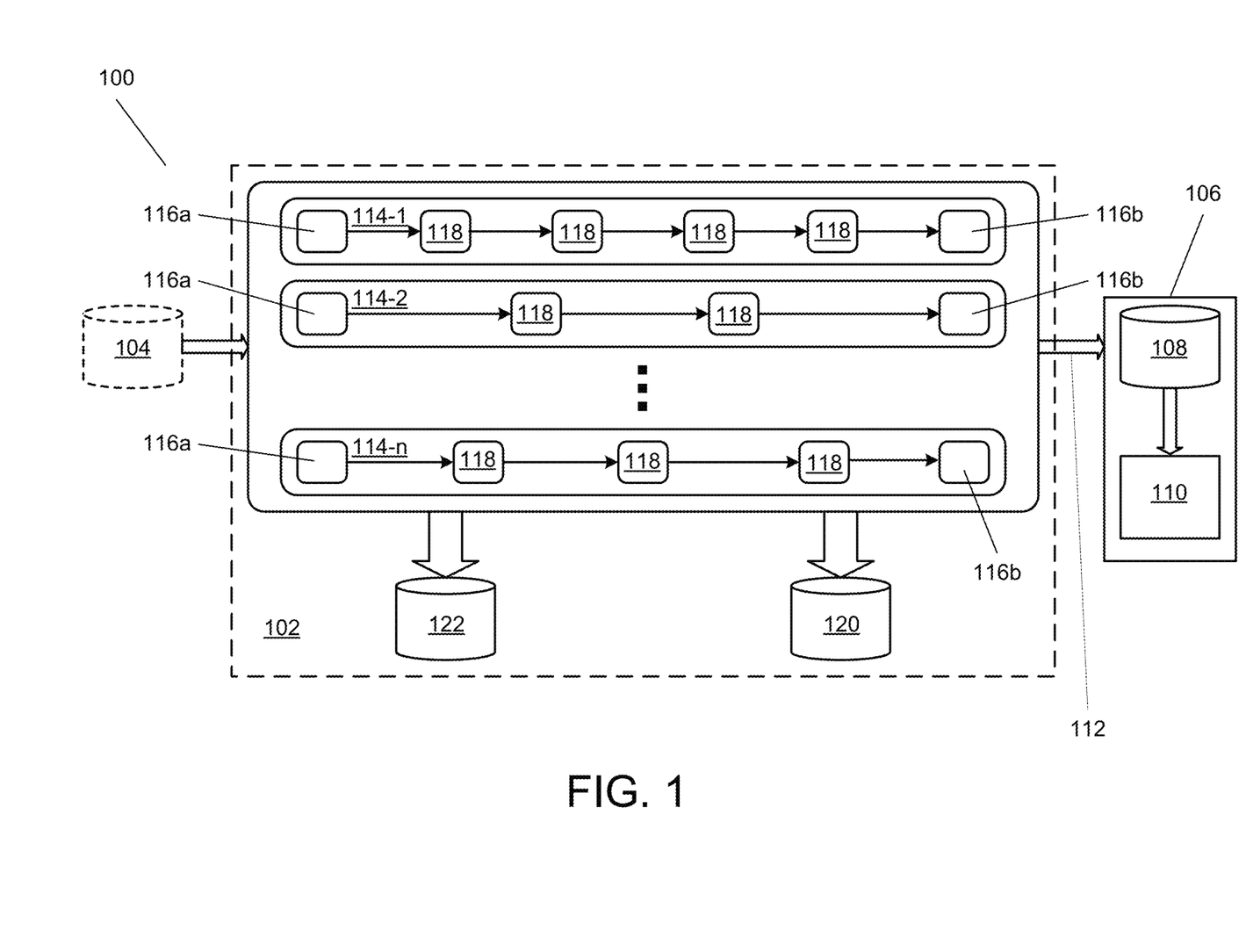
FIG. 1 illustrates, in simplified form, an overview of a system incorporating our system and method for Security Incident & Event Management (SIEM) case creation.

With the foregoing in mind, FIG. 1 illustrates, in simplified form, an overview of a portion 100 of a computer system incorporating our system and method for Security Incident & Event Management (SIEM) case creation (hereafter, for simplicity, referred to as the "Case Creation Platform"). As shown in FIG. 1, the Case Creation Platform 102 is deployed between a pool of alerts 104 and an SIEM Platform 106. The pool of alerts 104 is of the type (i.e., originating from a database or from a stream of alerts) conventionally accessed and used by prior art SIEM Platforms 106, and reflect detections of different types of potential security incidents. Such incidents are huge in number, potentially on the order of 100,000 to 500,000 or more per day. Such incidents can range from the mundane and relatively unimportant to severe and highly important.

The SIEM Platforms 106 are generally made up of a database 108 containing cases made up of alerts originating from the pool of alerts 104 and security event manager software 110.

As deployed, the prior art SIEM Platform 106 runs on one or more servers made up of, for example, one (and typically more than one) processor and RAM, ROM, I/O and, in most cases, are coupled to non-transient data/program storage.

Likewise, Case Creation Platform 102 is implemented in software that also runs on one or more servers as described above. However, in contrast to the conventional SIEM system and approach, the Case Creation Platform 102 is interposed between the pool of alerts 104 and SIEM Platforms 106.

Since alert pools 104 and SIEM Platforms 106 as referred to herein, by themselves, are conventional and in the prior art, no further discussion of them will be provided.

Turning to the Case Creation Platform 102, in simplified overview, the purpose of the Case Creation Platform 102 to analyze and cull a subset of that huge number of alerts, typically on a time-frame basis, prioritize them and group them into cases for use by the SIEM Platform 106.

By way of example, consider a phishing tactic where people are sending emails to an entity to try to get recipients to open and click on links or open a document therein for some nefarious purpose. To create the alerts, there might be ten different analytic detections around that activity that might indicate that particular type of security attack is happening, with each detection generating one or more alerts. According to the teachings herein, instead of those alerts being fed to the SIEM Platform 102, they would be obtained by the Case Creation Platform 102 which would obtain all the detection outputs from time frame, coalesce them together, prioritize them against each other, decide which ones are more important and less important, such that the output of the Case Creation Platform 102 would be a subset of those detection outputs that are all related together, potentially (optionally) enriched with some additional metadata, and that output 112 would be fed to the SIEM Platform 106 so that an understanding of what happened over that given time frame can be obtained, and action can be taken as, where and when appropriate.

This is accomplished by the Case Creation Platform 102 through creation of a series of pipelines 114-1, 114-2-114-n. In general, each pipeline 114-1, 114-2-114-n is made up of a set of serialized tasks. More specifically, each pipeline includes, at its start, a "Source Task" 116a which retrieves alerts from the pool of alerts 104, and, at its end, at least one "Sink Task" 116b which supplies its output as a case to the SIEM Platform 106.

In each pipeline 114-1, 114-2-114-n between the Source Task 116a and Sink Task 116b are further Process Tasks 118, generally two or more, that operate sequentially on the output of the preceding task and thereafter provide their output to the next Process Task 118 in the series making up their pipeline. Depending upon the operation of a particular Process Task 118 and what it is configured to do, it may or may not reduce the volume of alerts.

As the processing of the tasks in each pipeline 114-1, 114-2-114-n proceeds, a copy of the input data being input into each task in the pipeline (e.g., individual alerts, groups of alerts or one or more SIEM cases) is held in memory (or, depending upon the implementation and, likely, expected data volume, stored in a Task Log 120) until the respective task completes. In addition, information about the task that is being performed is stored in the Task Log 120. In the event that an error occurs in one of the tasks 118 in a pipeline 114-1, 114-2-114-n, relevant information is also collected and stored in an Error Log 122.

Further details of the Task Log 120 and Error Log 122 will be described in greater detail below.

Note here that, depending upon the particular alerts, time window and Process Tasks 118 involved in a particular pipeline 114, the number of cases output to the SIEM Platform 106 will be less than, or in rarer instances, equal to, the number initial alerts.

Figure 2:
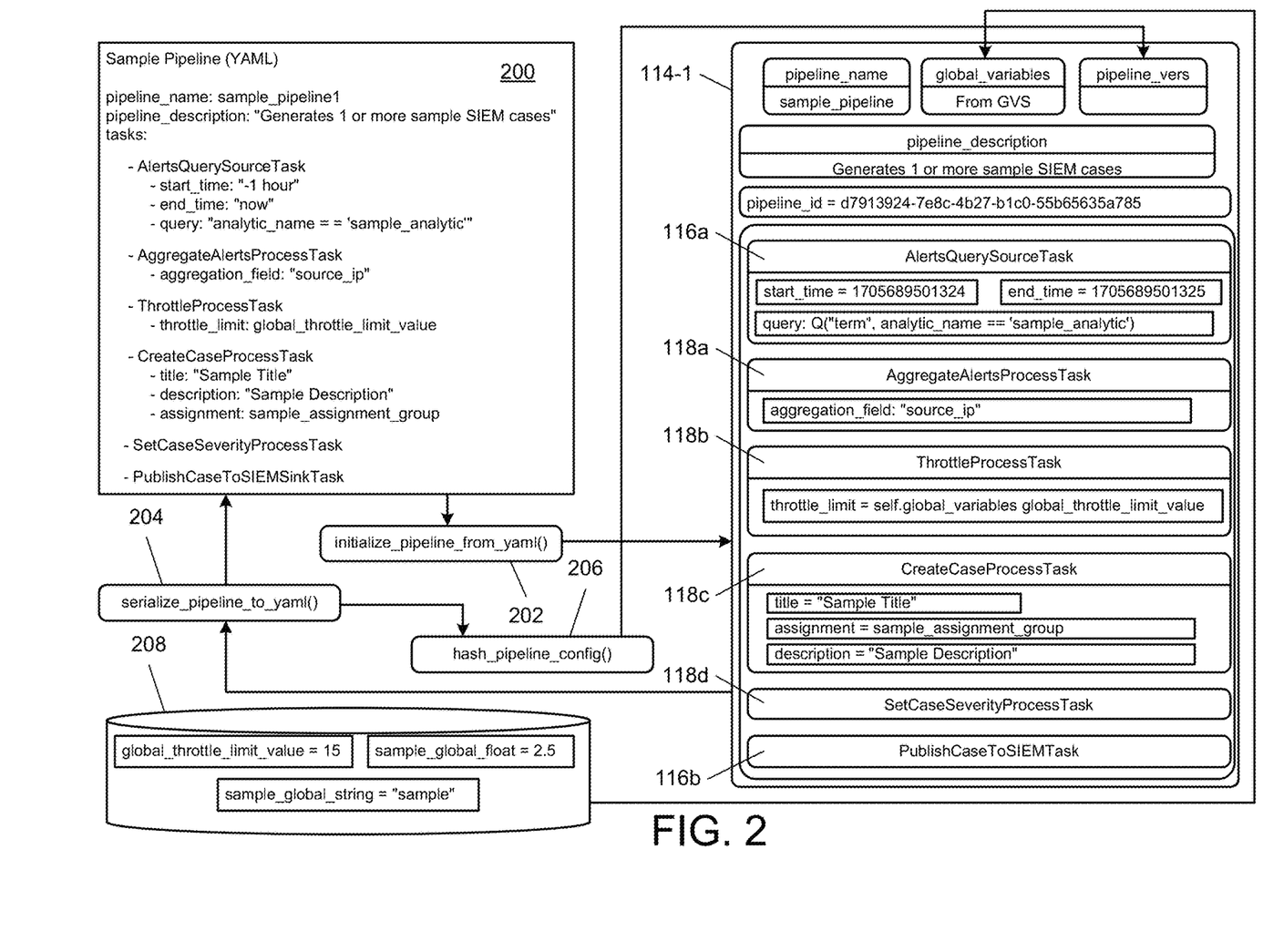
FIG. 2 illustrates, in simplified form, an example of creating a pipeline, for example, the six task pipeline of FIG. 1.

FIG. 2 illustrates, in simplified form, an example of creating a pipeline, for example, the six task 118 pipeline 114-1 of FIG. 1.

More particularly, FIG. 2 illustrates an example of pipeline object creation and serialization using an example configuration file 200, which, as shown is in YAML and defines the pipeline and task objects. YAML is a superset of JSON, which is an open standard file format and data interchange format that uses human-readable text to store and transmit data objects consisting of attribute-value pairs and arrays. While the discussion that follows will refer to YAML and JSON for simplicity, it is to be understood that many other JSON-like formats are available and can be used in place of those herein, the important aspect being that the format of the data objects consist of attribute-value pairs and arrays, not the particular format used. Advantageously, the use of this type of configuration file allows the pipeline it creates to be dynamically ported to another system where the pipeline, or some portion thereof can be reconstituted and re-run using alert and other information obtained from the Task Log 120 and Error Log 122 and/or some source other than the original source for the alerts and other external information source(s). This makes it possible to run automated retries of the pipeline within a closed environment and, if desired, incorporate various changes, manually or dynamically, in the process.

The YAML configuration file 200 is used to create the example pipeline 114-1 in FIG. 2 creates a source task 116a object named "AlertsQuerySourceTask" a sink task 116b named "PublishCaseToSIEMSinkTask" and four serialized, intermediate, process tasks, sequentially, "AggregateAlertsProcessTask" 118a, "ThrottleProcessTask" 118b, "CreateCaseProcessTask" 118c and "SetCaseSeverityProcessTask" 118d, having the respective parameters identified therein. This is performed by running the "initialize_pipeline_from_yaml( )" procedure 202.

Likewise, the process can be reversed (i.e., YAML code for a pipeline can be created from a pipeline by running the "serialize_pipeline_to_yaml( )" procedure 204.

In addition, since it is possible to run and re-run the same pipeline with minor changes, a pipeline 114-1, will generally include within it a version identifier (to differentiate it from other versions of the pipeline with the same name) that is created by running the "hash_pipeline_config( )" procedure 206. In addition, to the extent that a pipeline 114-1 makes use of any global variables (i.e., one or more will be common to multiple pipelines), they are retrieved from non-transient Global Variable Storage (GVS) 208.

Figure 3:
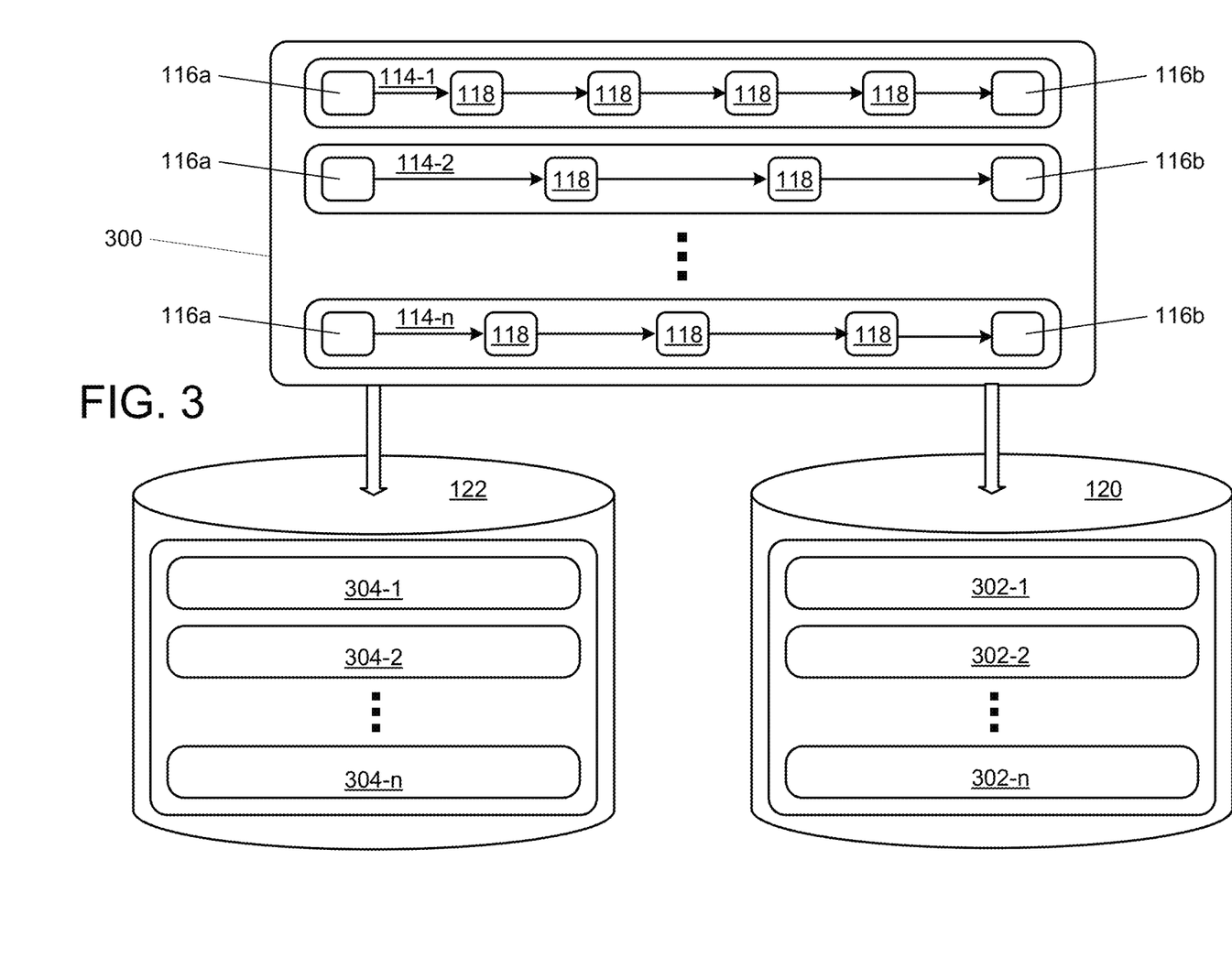
FIG. 3 illustrates, in simplified form, further details of the Task Log and Error Log of FIG. 1 for a set of pipelines.

FIG. 3 illustrates, in simplified form, further details of the Task Log 120 and Error Log 122 of FIG. 1 for a set of 300 pipelines 114-1, 114-2-114-n. As shown, the Task Log 120 is made up of a series of task context objects 302-1, 302-2-302-n. Likewise, the Error Log 122 is made up of a series of error state objects 304-1, 304-2-304-n that are used for handling errors that occur during execution of a pipeline for case creation. The task context objects 302-1, 302-2-302-n and error state objects 304-1, 304-2-304-n are JSON serialized and stored in non-transient storage.

Figure 4:
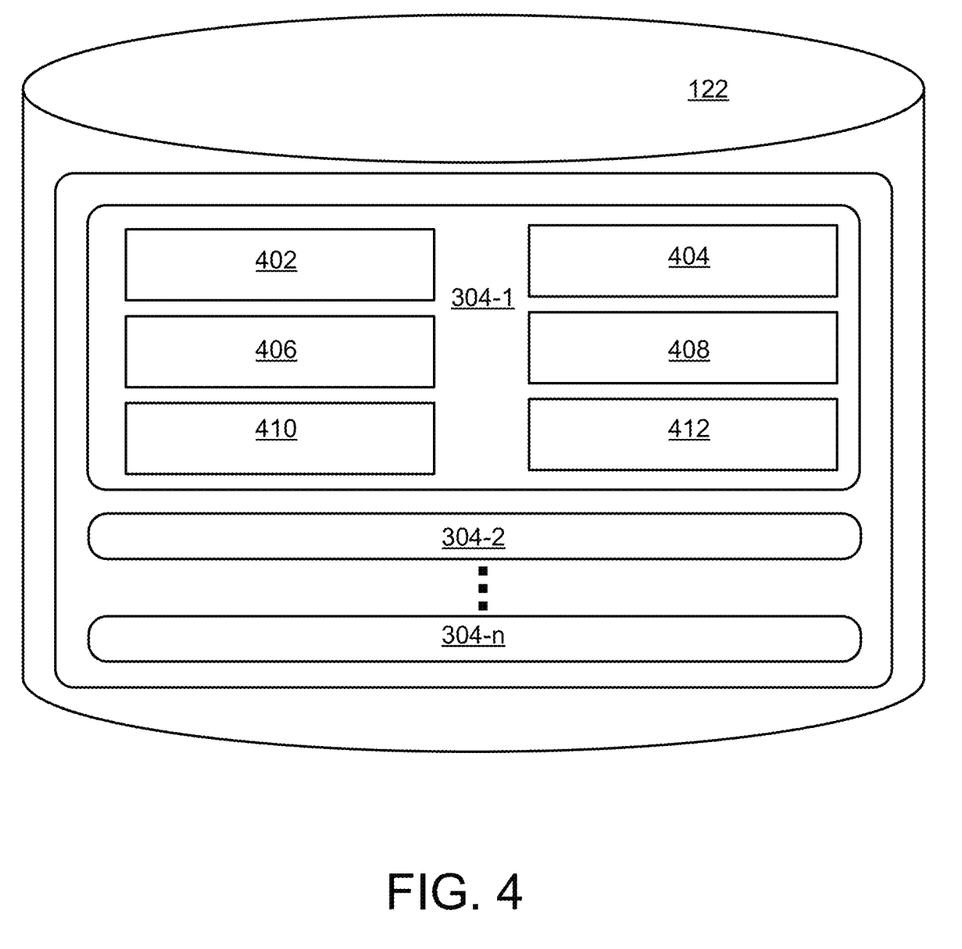
FIG. 4 illustrates, in simplified form, further details of the Error Log of FIGS. 1 and 3.

FIG. 4 illustrates, in simplified form, further details of the Error Log 122 of FIGS. 1 and 3. As shown, each error state object 304-1, 304-2-304-n (the details of only one of which 304-1 are shown) is a record of a failure that occurred during execution of a task 116a, 118, 116b within a pipeline and includes a "Failed Pipeline/Task ID" 402, a "Failed Pipeline/Task Name" 404 which together identify the specific pipeline where the failure occurred and the specific task that failed (i.e., had an error). In addition, each error state object 304-1, 304-2-304-n includes a list 406 of all the tasks in that pipeline along with a Timestamp 408, a copy 410 of the data that was input to that task along with Exception and/or Traceback information 412.

An Exception occurs when unexpected behavior (such as an error) is encountered during software execution. This can interrupt software execution and present brief details about the error, for example, for use by a software developer or automated handling program. There are many different varieties of exceptions, for non-limiting illustrative purposes only, some examples of python exceptions can be found at:
  https://docs.python.org/3/library/
    exceptions.html#concrete-exceptions
although there is no limit to the type and/or form for an exception, as they can be implementation, language and/or application dependent.

A Traceback, also known as a stack trace or a stack backtrace, is a report of the active stack frames present during program execution at a certain point. For example, in python, a traceback is generated when an exception is raised, and it details a subset of the function calls which preceded the error. This information provides important context useful for understanding what happened during program execution just before an error occurred.

The text of the exception and/or traceback that may be associated with an error is necessary to understand what went wrong for purposes of later analysis. This data is stored as a string in the Error Log 122.

All of the stored information therefore reflects the pipeline state at the time of the error, which can then be used to automatically investigate the cause of the error.

Figure 5:
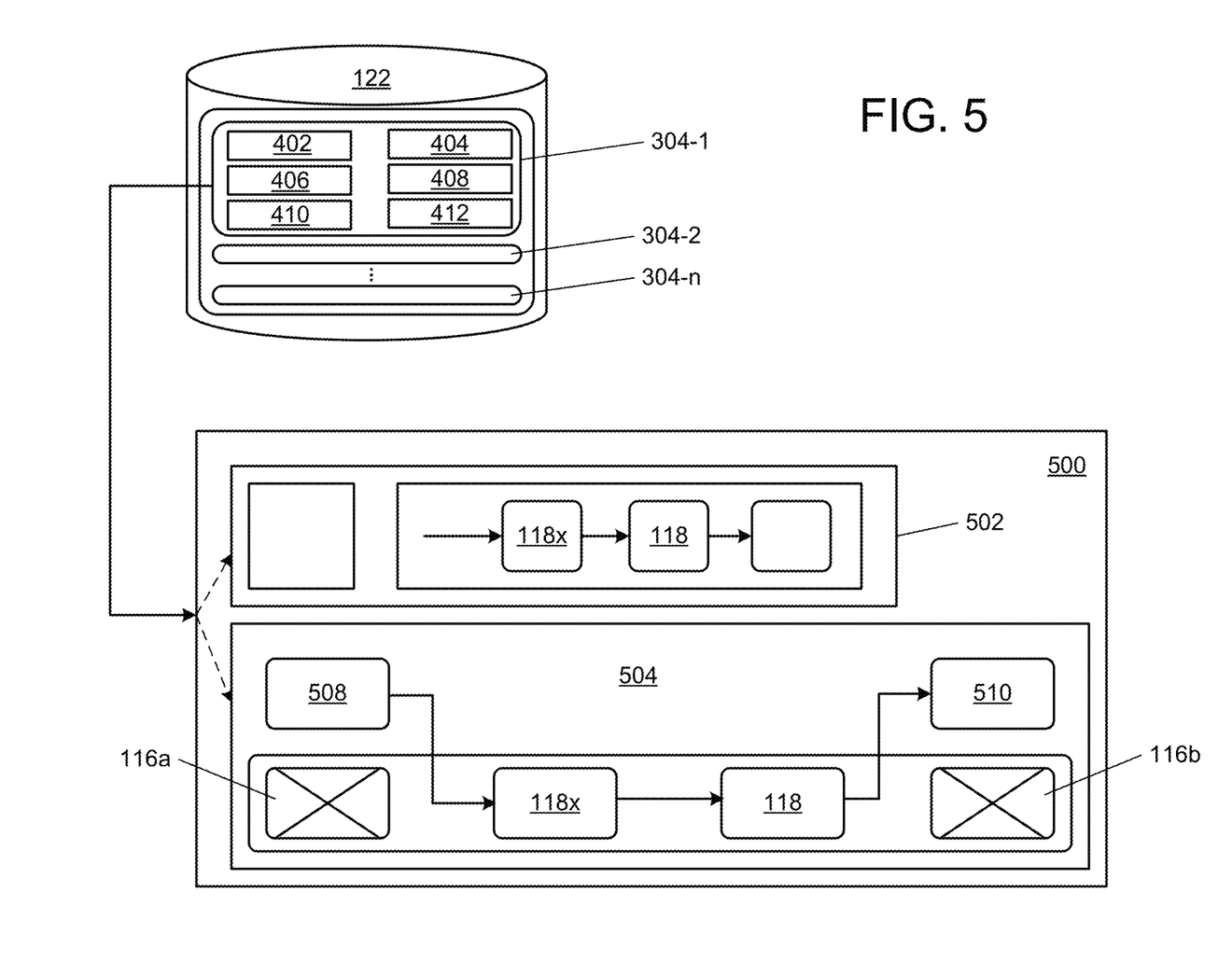
FIG. 5 illustrates, in simplified form, the use of the Error Log when a failure occurs in a task in a pipeline after the pipeline has completed.

FIG. 5 illustrates, in simplified form, the use of the Error Log 122 when a failure occurs in a task in a pipeline after the pipeline has completed.

For purposes of explanation, presume that the pipeline of interest is the second 114-2 shown in FIG. 1 and that a failure has occurred in the first task 118 after the source task 116a.

For purposes of handling the failure, by way of example, one of two approaches can be used through transfer of data from the Error Log 122 to an offline (e.g., "development") environment 500. Specifically, the JSON serialized data from an error state object 304-1 can be transferred to the offline environment 500 either for a failed pipeline inspection process 502 or for pipeline execution testing 504 (also referred to as a "mock out") where the input to a pipeline and pipeline, or portion thereof, would come from and be reconstituted from a combination of the error log 122 and the task log 120. For further clarity, a "mock out" is a local re-instantiation of a pipeline (or portion thereof) containing at least some of the same tasks and alert data as the pipeline where a failure occurred.

For the failed pipeline inspection process 502 to occur, the JSON serialized data from the error state object 304-1 is deserialized 506 and, for example, the pipeline 114-2 where the error occurred is re-instantiated beginning from the input to the task 118x where the failure occurred and is re-run using the copy of the input data to that task 118x (obtained from memory, the Error Log 122 or the Task Log 120, depending upon the particular implementation variant).

Alternatively, pipeline execution testing 504 can be performed using a re-instantiation of the entire pipeline (with a local input task 508 substituting for the source task 116a and a local output task 510 substituting for the sink task 116b) so that they will only locally obtain the specific alert data originally sourced by the source task 116a from the Error Log 122 as opposed to re-connecting to and obtaining data from the original alert source. In this manner, it can be determined if the source of the error occurring in the failed task 118x may have been actually caused by an issue introduced in a task that preceded the failed task 118x, for example, through data miss-formatting, so that only through the failed task 118x using that data would the error manifest.

Re-instantiating from the beginning of the pipeline advantageously also provides the opportunity to modify the pipeline before execution. For example, it may be desirable, in some instances, to restart the pipeline from the beginning in order to allow the pipeline to run with different or modified data (for example, provided or modified by some IT personnel, or newly gathered by the source task using some different parameter, e.g., different time constraints). This option can also advantageously allow for a check as to whether there was an issue within the alert data which was processed at the time that the pipeline ran and failed, or if the failure was due to some other cause, for example, within the task that failed. Additionally or alternatively, another instance where the pipeline could advantageously be re-instantiated is to allow for one or more of the process tasks to be modified or replaced to assist in identifying, evaluating or fixing the cause of the failure.

Figure 6:
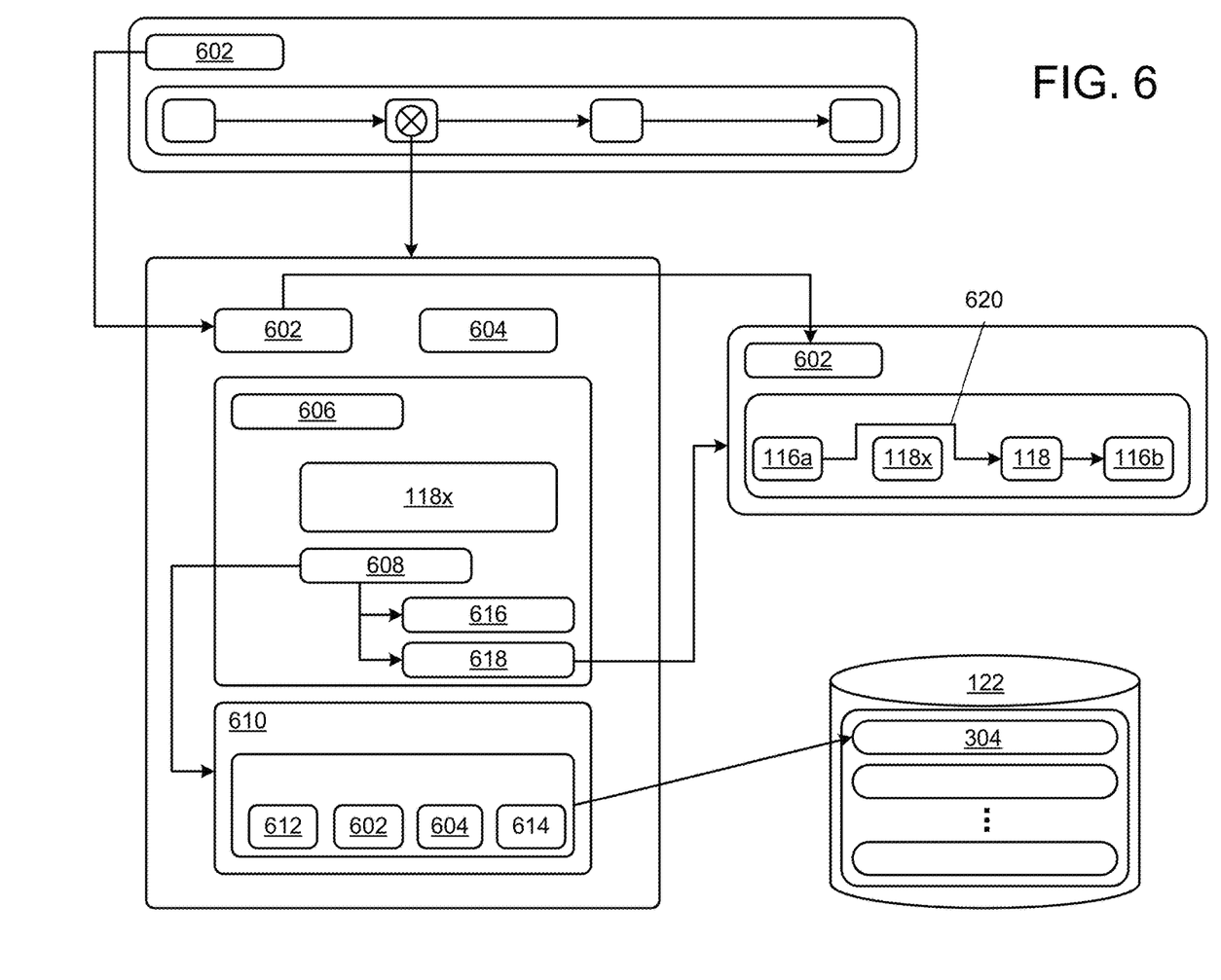
FIG. 6 illustrates, in simplified form, but in greater detail, an example of our approach when a task error occurs in a task of a pipeline during execution of the pipeline.

FIG. 6 illustrates, in simplified form, but in greater detail, an example of our approach when a task error occurs in a task 118x of a pipeline 114-2 during execution of the pipeline. More particularly, how state is saved in the Error Log 122 when an error is encountered while processing alert data 104.

Also shown is the mechanism in which a pipeline can optionally, automatically, skip a failed task and pass the task's input data along if the subsequent task is compatible with the preceding task As shown, when a failure occurs the pipeline state are obtained, in the form of the pipeline metadata 602, task metadata 604, the data 606 from the task preceding the failed task 118x, (i.e., the input data for the failed task).

Specifically, an error state process 608 serializes and stores the error state by storing a copy of the input data 612, the pipeline metadata 602, the task metadata 604, and the exception 614 in the Error Log 122 in an error state object 304.

In addition, the error state process 608 programmatically determines, using appropriate stored rules and logic, whether, for example, the failure is such that any further processing should terminate 616 and an indication should be sent to the relevant IT personnel of the failure, or if the failure is such that the processing can proceed 618 while skipping the failed task 118x. If the latter, the process 114-2 will be re-instantiated such that, depending upon the particular implementation, the failed task will be bypassed 620, or the re-instantiation will not include the failed task 118x at all.

In the situation where a pipeline is skipping a failed task, in some implementations, re-instantiation will not be needed. In such an instance, the pipeline could simply log the error but then pass the former input to the failed task as the input to the next sequential task in the pipeline. Advantageously, since an error log entry would still be created when skipping of a failed task occurs, the error log can be used to re-instantiate the failed pipeline after the original pipeline has completed (which will cause a replication of the error) for purposes of determining the cause. Additionally, or alternatively, in some implementations, it may be desirable to re-instantiating the pipeline right after a failure occurs, for example to retry a failed task. This can be desirable if there is a possibility of a connection error when a task seeks to connect to some external resource for some reason. In other words, this may be desirable for types of errors which may be temporary and may automatically resolve in a short time frame. To handle such a scenario, the configuration could include a 'retry' parameter that would keep re-instantiating from the point of failure and retrying the task or pipeline until either it succeeds or some limit (e.g., number of retries or time) is reached.

Figure 7:
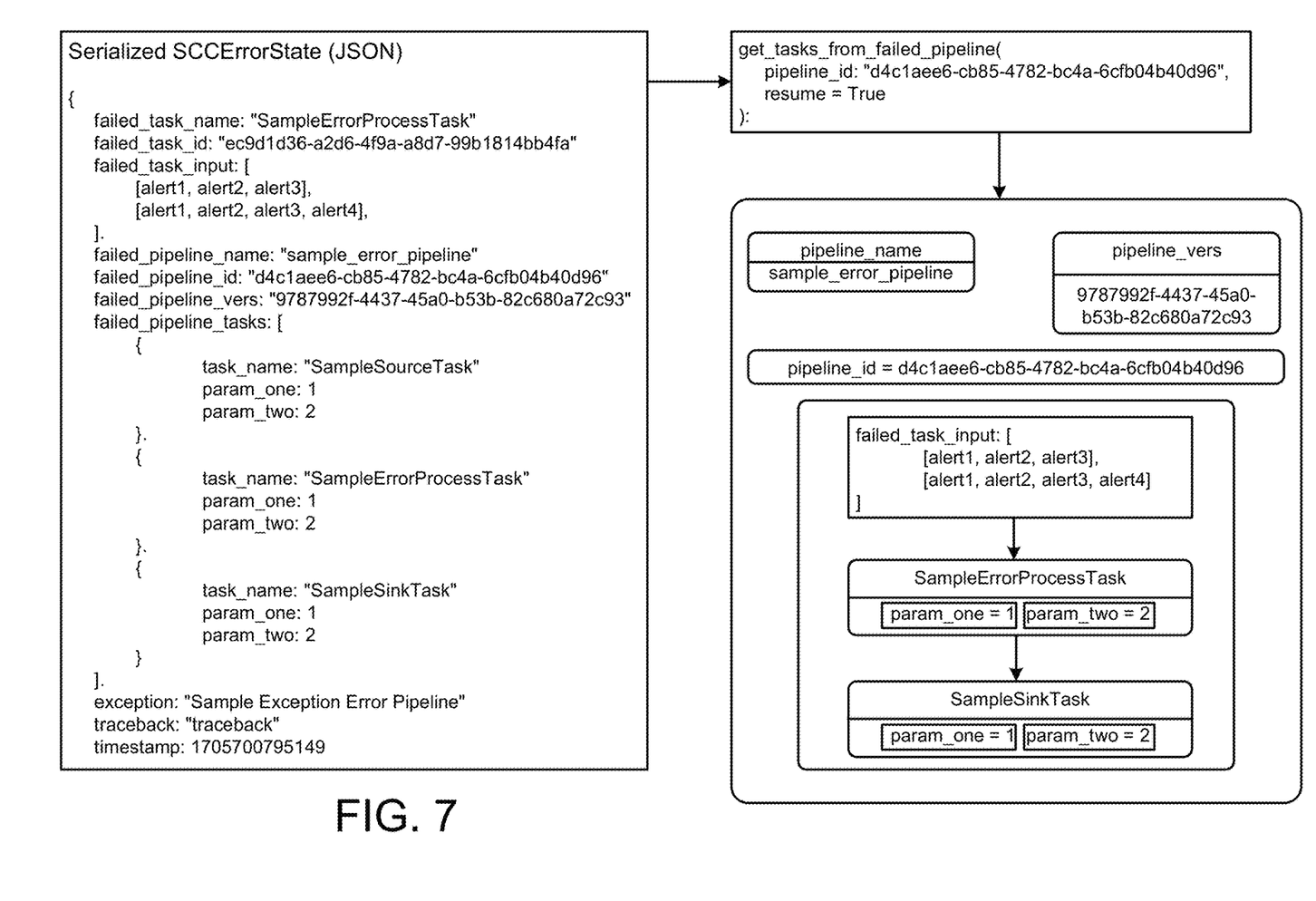
FIG. 7 illustrates, in simplified form, an example of pseudo code for re-instantiating a pipeline from the point of failure, to enable it to be analyzed, fixed and completed.

FIG. 7 illustrates, in simplified form, an example of pseudo code for re-instantiating a pipeline from the point of failure, to enable it to be analyzed, fixed and completed.

Figure 8:
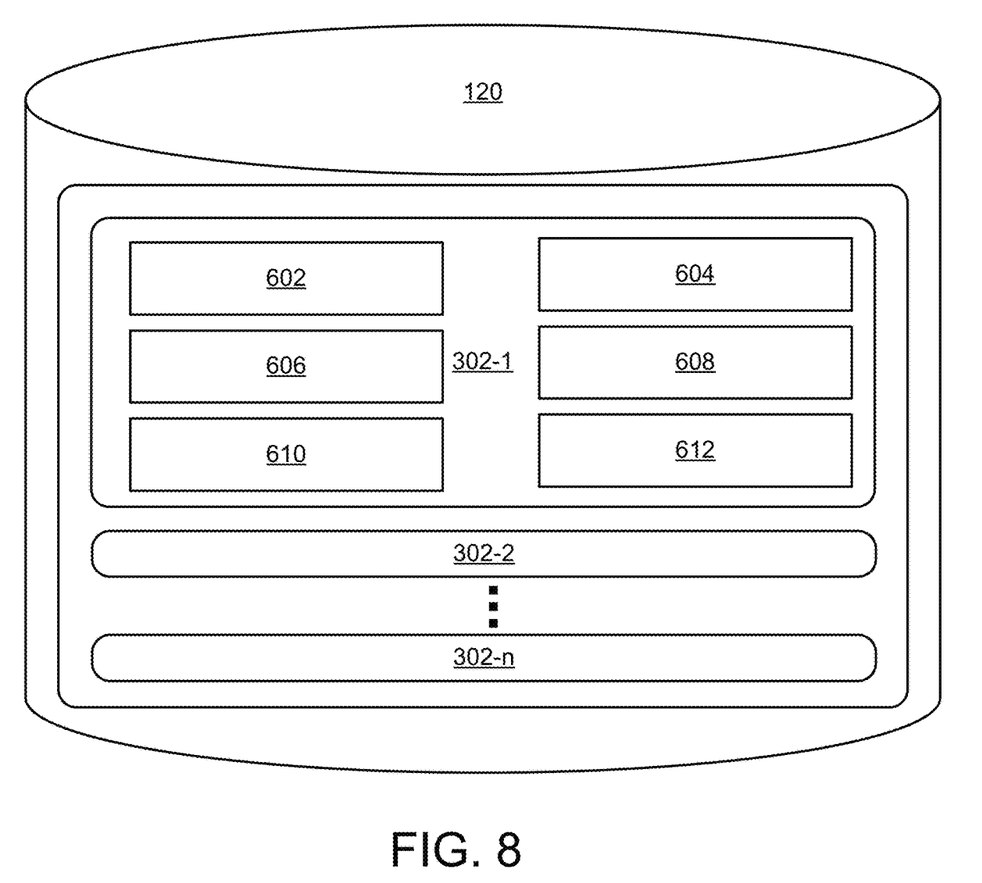
FIG. 8 illustrates, in simplified form, further details of the Task Log.

FIG. 8 illustrates, in simplified form, further details of the Task Log 120. As noted above, the Task Log 120 contains a set of task context objects 302-1, 302-2-302-n, each of which includes a Task/Pipeline name 602, a Task/Pipeline ID 604, a Task Type 606, an Input Size/Length 608, a Start/End Time 610 for the respective pipeline and the Task Parameters 612 The Task Type 606 is a string that identifies the parent object of that particular task and can be of the type "source," "process" or "sink" with each type dictating the expected format of the data input to them and output by them.

The Input Size/Length 608 fields stored in the Task Log 120 are stored as integers and describe the volume of data inputted to a task during Pipeline execution. The Input Length specifies the number of alert or case objects input to a Task and the Input Length specifies the number of bytes required to store all of those alert or case objects.

Since each Task used in a Pipeline modifies the data which is processed through the pipeline, most tasks include Task Parameters 612, which are set in the Pipeline configuration process code, typically in YAML format. These Task Parameters 612 change the way that the pipeline data is modified. For example, a Source Task which queries the alert pool 104 may include the following parameters:

start_time—the time cutoff to reduce the scope of alerts based on when they were created; and filter_query—query logic to further reduce the scope of alerts.

By way of further example, a Process Task which aggregates alerts into groups may include the following parameters:

common_fields—a list of fields present in each alert which should be considered when determining if the alerts being processed are similar enough to be aggregated together; and exclusion_map—a list of key, value pairs. If these pairs are found within an Alert, it should not be aggregated with any other Alert.

By way of yet a further example, a Sink Task which modifies some attributes of a case before publication to the SIEM may include the following parameters:

case_assignment—which is a user or group who will be assigned this case; and case_severity:—which is a severity that will be used for the case in the SIEM.

Having described the various components and their individual operations, a detailed representative specific example of alert data and how the operation of a pipeline and our process to improve SIEM efficiency will now be discussed.

Figure 9:
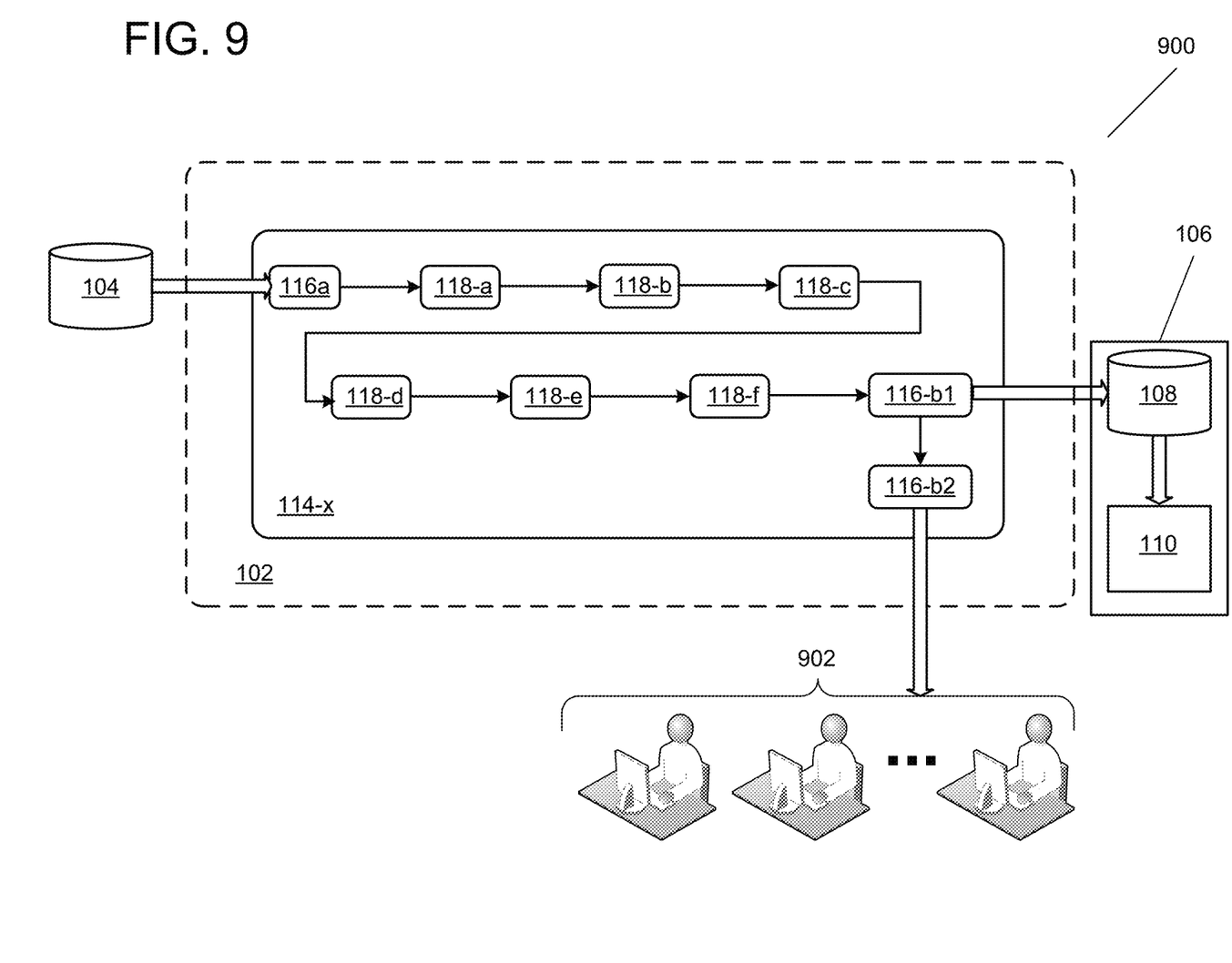
FIG. 9 illustrates, in simplified form, an example involving operation of an example pipeline within part of an example Case Creation Platform.

FIG. 9 illustrates, in simplified form, an example 900 involving a pipeline 114-x called, for purposes of this example, "Phishing Campaign 1" within part of an example Case Creation Platform 102.

In simplified overview, it is presumed this pipeline 114-x runs every 4 hours and generates 0 or more cases around a particular email phishing campaign/technique. The pipeline begins by gathering alerts from the alerts database 104 which are relevant to the campaign/technique. The pipeline 114-x then filters out alerts that are, for one or more reasons not germane to understanding, not needed an/or useful for purposes of SIEM analysis. The pipeline 114-x then aggregates the remaining alerts together based on, for example, the domains which sent the phishing emails. Finally, the pipeline creates a SIEM Case for each group of the aggregated Alerts and (optionally) takes one or more additional action(s).

As shown in FIG. 9, this pipeline 114-x is made up of a source task 116a, six process tasks 118-a, 118-b, 118-c, 118-d, 118-e, 118-f, and two sink tasks 116-b1, 116-b2.

The source task 116a has a Task name of "AlertsDBQueryTask," has no inputs (because no task precedes it), and, for this example, has the following parameters:

skippable=False
start_time="4 hours ago"
end_time="now"
database_index="smtp-alerts"
query_logic=(analytic_name: "phishing_campaign_analytic_1" OR
analytic_name: "phishing_campaign_analytic_2" OR "phishing_campaign_analytic_3") AND NOT (recipient_organization: "sample_organization")

This source task 116a is the first task in the pipeline 114-x and operates to query the alerts database 104 to obtain the initial list of alerts which, via subsequent tasks, will be processed and culled as they pass through the rest of the pipeline 114-x.

The next task in the pipeline 114-x is the first process task 118-a. This process task 118-a has a task name of "FilterObservableByExternalLogSource," has as its input the output data of the source task 116a, and, for this example, has the following parameters:

skippable=True
log_source="smtp_remediated_emails"
observable_present="mail_message_id"
start_time="4 hours ago"
end_time="now"

This process task 118-a is used to query a specific log source for the presence of a particular observable value (or values) extracted from each alert output by the source task 116a.

The output of that process task 118-a is the input to the next process task 118-b in the pipeline 114-x.

This next process task 118-b has a task name of "FilterObservableByRecentCases," and it has, for this example, the following parameters:

skippable=True
start_time="7 days ago"
end_time="now"
observable_data_type="domain"
observable_tags=["sender_email_address"]
assignment="SIEM_group_1"

This process task 118-b is used to reference the SIEM Case database 108 and check for any recent cases which are similar to each inputted alert.

The output of this process task 118-b is the input to the next process task 118-c in the pipeline 114-x.

This next process task 118-c has a task name of "AggregateAlertsByObservable" and it has, for this example, the following parameters:

skippable=False
observable_data_type="domain"
observable_tags=["sender_email_address"]

This task 118-c aggregates alerts it receives from the preceding task 118-b into groups based on a particular observable type. In this example, the "domain" observable in the sender_email_address field is used.

The output of this process task 118-c is the input to the next process task 118-d in the pipeline 114-x.

This next process task 118-d has a task name of "CreateSIEMCasesTask" and it has, for this example, the following parameters:

skippable=False
case_description=<description>
case_title=<title>
case_assignment="SIEM_group_1"

This task 118-d creates SIEM case objects, one for each group of alerts provided as its input.

This next process task 118-e has a task name of "SetCaseSeverityByMaxAlert" and it has, for this example, the following parameter:

skippable=True

This task 118-e assigns a severity to each case.

The next process task 118-f has a task name of "ThrottleByVolume" and it has, for this example, the following parameters:

skippable=False
throttle_limit=50
sort_by="severity"

This task 118-f throttles (truncates) the list of input objects so that a set amount/limit is not exceeded.

The output of this last process task 118-*f* is input to the first sink task 116-*b*1. This first sink task 116-*b*1 has a task name of "PublishCasesToSIEMTask" and it has, for this example, the following parameter:

skippable=False

This sink task 116-*b*1 publishes each case to the SIEM platform 106.

In addition, this pipeline 114-*x* includes a second sink task 116-*b*2 and it has a task name of "NotifySubscribedUsers" and it has, for this example, the following parameters:

skippable=True
subscribers=[userA, userB, userC]
contact_method="email"

Based upon the foregoing, the operation of the example pipeline 114-*x* of FIG. 9 proceeds as follows.

First, the source task 116*a* queries the alerts database 104, within its "smtp-alerts" index. Based upon the "start-time" parameter, it filters for alerts which were created within the last 4 hours. The query is done using the "query_logic" parameter to ensure that the alerts which are returned from the alert database 104 were generated by one of the three specified analytics.

In this example scenario, each of the three analytics was created to identify suspicious emails which appear to be part of the same phishing campaign/technique based upon the fact that an alert was created for each individual suspicious email and stored in the alert database 104.

As specified, the "query_logic" parameter may also be configured to exclude certain alerts, for example, as configured in the example, the "AND NOT (recipient_organization: "sample_organization") ensures that alerts which were created for emails sent to the particular recipient_organization (for example, a specific team or branch office), in this example the "sample_organization" are not returned from the alerts database.

The query of the alerts database 104 may involve examining hundreds or even thousands of alerts that would otherwise be sent to, and processed by, the SIEM platform 106.

In this example however, the result of this source task 116*a* yields only 35 alerts. In addition, for purposes of understanding this example, each of the 35 alerts would contain the following fields:

analytic_name;
analytic_description;
timestamp;
severity;
unique_identifier;
sender_email_address;
recipient_email_addresses;
email_subject;
email_message_id; and
urls_extracted_from_email_bodies.

Those 35 alerts are then passed to the first process task 118-*a*.

Now, presume for this example, that there is also a log source named "smtp_remediated_emails," which is populated by some external process. That log source contains logs of emails which were flagged as suspicious by the recipient, and subsequently removed from their inbox.

It is inefficient to create SIEM Cases around phishing emails which have already been remediated. So, for this example, this task 118-*a* searches the "smtp_remediated_emails" log source and, if this task 118-*a* finds an alert's "mail_message_id" in the "smtp_remediated_emails" log source, that alert is removed from further processing in this pipeline 114-*x*.

At this point, it should be stated that, while executing this task, exceptions may arise which make the task unable to complete.

One example of such an exception could be a "Connection Error" exception, meaning that the "smtp_remediated_emails" log source is unreachable over the network. When an exception like this exception is encountered, the state of the pipeline 114-*x* is saved externally into the Error Log 122, including a copy of the input to this task (i.e., the 35 alerts) and, as noted above, depending upon the failure, the failed task could be retried, if the implementation provided for it, it could be skipped, if the task was skippable or the pipeline could be terminated. In any of these scenarios, an error log entry would be created.

Since this task 118-*a* contained the parameter "skippable"=True, in the pipeline's configuration (e.g., in YAML). As a result, advantageously, after saving the pipeline state externally, the pipeline can automatically continue to execute the remaining tasks (effectively bypassing this task 118-*a*) using the alerts that were the input into this task 118-*a* as the inputs to the next task 118-*b* in the pipeline 114-*x*. This continued execution is possible because the next task 118-*b* "FilterObservableByRecentCases" is expecting the same input type (alerts) as the task 118-*a* that experienced the exception.

Of course, by automatically continuing execution, the filtering that this task 118-*a* would have provided is lost. So there is the potential to create unnecessary SIEM cases. However, that occurrence still provides an advantage because the alternative is stopping the pipeline and creating no SIEM cases.

It should be generally be understood that the creator of a pipeline must decide which tasks are crucial enough to be marked as "skippable" or not. For example, a task which is expected to reduce the volume of alert data in the pipeline from ~10,000 to ~50 is likely too important to ever be skipped, whereas a task that may cull only a few alerts or alerts of nominal importance, can readily be skipped. In other words, the skip-ability of a task is an implementation-specific design choice.

For purposes of continued explanation, we will presume that the foregoing task completed without throwing an exception and its culled out an additional 5 alerts, leaving 30 alerts for further processing. Those 30 alerts become the input to the next task 118-*b* in the pipeline 114-*x*.

For this next task 118-*b*, all the SIEM cases which were created in the past 7 days and were assigned to the group "SIEM_group_1" are checked for "domain" observables which contain the tag "sender_email_address." If an alert contains the same "domain" observable with the tag "sender_email_address" as any recently processed SIEM cases, that alert is dropped from consideration. Thus, the effect of this task 118-*b* is to drop any alerts from the pipeline 114-*x* which contain an email sent from a domain that has already been triaged/analyzed in another SIEM case recently. Advantageously, this reduces the volume of unnecessarily redundant cases.

For further purposes of this example, presume that this task 118-*b* has culled (i.e., filtered out) an additional 7 alerts, leaving 23 alerts for further processing. Those 23 alerts become the input to the next task 118-*c* in the pipeline 114-*x*.

The next task 118-*c* in the pipeline 114-*x* makes use of the "observable_tags" parameter to filter observables to be used in aggregation, such that only the observables containing the specified tags are considered and the rest are culled out. In this example, these tags were selected because they indicate the domain from which the phishing email was sent. For example, "malicious-website.com" is the domain extracted from an alert resulting from an email from "malicious-sender@malicious-website.com." The aggregation allows for creation of SIEM cases containing multiple similar alerts as they are all likely related to each other. Grouping alerts together like this allows for greater efficiency when evaluating SIEM cases.

After this task 118-c runs, 10 groups of alerts are output for use by the next task 118-d, with each group containing 1-3 alerts which all share a common "sender_email_address" domain.

While executing this task 118-c, as with a previous task 118-a, exceptions may arise which make the task unable to complete. One such example exception could be a "Data Parsing Error." Alerts which are generated by analytics and added to the alert database 104 depend on, and may come from, a variety of data sources which are managed/controlled by multiple external parties or programs. If there is an error in an upstream process, then unexpected data may be included in an alert or expected data may be omitted from an alert, in either case causing an exception to be thrown.

For example, an external source may have populated the "sender_email_address" field as "malicious-sender@" so the value is missing the "malicious-website.com" domain. When the task 118-c attempts to aggregate alerts by sender domain, a Data Parsing Error (such as a python AttributeError or KeyError) will occur because the malformed "sender_email_address" was encountered. In this example, if this occurred, the pipeline's 114-x state is saved externally in the Error Log 122, along with a copy of the inputs to this task.

Now, because this task has the parameter "skippable"=False, once the pipeline's state 114-x is saved, the pipeline execution would stop and, optionally, a notice might be sent to one or more persons.

With such an exception that causes termination of the pipeline 114-x, the saved pipeline state allows for later re-instantiation of the pipeline at the point of failure (just before executing this task) and thereby allows for efficient troubleshooting of the exception with a manageable amount of data.

In addition, because execution of the pipeline 114-x would stop after the exception, cases which should have been created would likely be missed. Advantageously, using the re-instantiated pipeline, the input alerts can be accessed and, for example, the alert with the malformed "sender_email_address" could be deleted or corrected. Moreover, once that is done, the pipeline can be re-run from the start of that task 118-c, to add the missing cases to the SIEM platform 106. This approach to remediation provides further advantages because it is easier than attempting to figure out which SIEM cases may be missing if there was no access to the re-instantiated pipeline. Still further, a developer can also examine the exception and associated traceback, for example, either by running the re-instantiated pipeline and re-creating the exception, or by reading it from the stored pipeline state within the error log. Thus, with this information, the developer can update the pipeline configuration (e.g., YAML) to better handle these exceptions in the future, for example, in an automated fashion, by adding a task, early on, to automatically filter out alerts with a malformed "sender_email_address" field and store them somewhere for further review.

For further purposes of continuing this example, presume that this task 118-c has completed without an exception. As such, the 10 alert groups become the input to the next task 118-d in the pipeline 114-x.

As noted above, this task 118-d creates SIEM case objects, one for each group of alerts. Specifically, each case object will contain a title and a description, and will be assigned to a particular group ("SIEM_group_1," "SIEM_group_2," "SIEM_group_3," etc.).

The title and description parameters can be provided in the pipeline configuration-as, for example, strings, so that each of the 10 SIEM cases have the same title and description.

Alternatively, the title and description can be provided in the pipeline configuration as a piece of code which outputs a string when executed. This allows each SIEM case to contain a dynamic title/description which can reflect the specific contents of the alerts associated with that SIEM case.

For example, the "case_title" parameter can be provided as a piece of code which extracts the number of alerts associated with a Case along with the "email_sender" domain associated with the SIEM case, for, example, a unique title string for each SIEM case (e.g., "Phishing_Campaign_1-malicious-domain.com-3 alerts").

As a result of completion of this task 118-d, the output is 10 SIEM cases, which are input to the next task 118-e.

As noted above, this task 118-e assigns a severity to each SIEM case.

Since each alert already had a severity assigned to it, this task 118-e looks at the alerts in each SIEM case and identifies the highest severity rating applicable to any alert that is present. That highest severity rating is used as the overall severity of the SIEM case.

Alternatively, other methods could be used to assign a severity to each SIEM case, for example based upon the type of alert, the number of alerts from a particular sender (as opposed to domain), or on any other basis.

After this task 118-e runs to completion, 10 SIEM cases are still output and used as input to the last process task 118-f in the pipeline 114-x before the sink tasks, 116-b1, 116-b2.

Again, as specified above, this task 118-f truncates a list of input SIEM case objects so that no more than a certain number of SIEM cases are provided to the SIEM platform 106.

In this example, the relevant parameter for this task 118-f is set so that a maximum of 50 SIEM cases will be output from the task. Having a task 118-f like this in the pipeline 114-x ensures that a massive volume of SIEM cases will not be created, or passed to the SIEM platform 106, if there is, for this example, ever a large spike in phishing activity.

Within this task 118-f, by way of example, if the specified limit parameter of 50 is exceeded, the input SIEM cases are sorted by severity, and the least severe cases (in excess of the 50 limit) are dropped from the pipeline or, stated another way, only the 50 most severe cases are output by this process 118-f.

Optionally, other actions can also be taken, for example, if the limit of 50 is exceeded, a notification can sent to the relevant people so that, for example, the large spike in phishing activity can be given extra or enhanced attention or higher priority.

After this task 118-f has completed, 10 SIEM cases are output because the throttle_limit was not exceeded.

The output of this final example process task 118-f is then passed to the first sink task 116-b1. As noted above, this sink task 116-b1 publishes each SIEM case to the SIEM platform 106.

Advantageously, additional sink tasks can optionally be included for further processing. By way of example, the pipeline 114-x of FIG. 9 also includes a second sink task 116-*b*2. This sink task 116-*b*2 is configured to send a notification to a group of subscribed users 902 to let them know that an SIEM case has been created by the Phishing Campaign 1 Pipeline 114-*x*.

Thus, as a result of the foregoing configuration and approach, the efficiency of the SIEM platform 106 is enhanced because the number of SIEM cases required to be processed by the SIEM platform 106 can be substantially reduced while still yielding a similar degree of threat and incident handling.

Moreover, as should now be understood, each pipeline can be configured to operate on different alerts, or based upon different parameters, such that different types of security incidents and/or events can be analyzed in a more granular fashion. In this way, error recovery, fault tolerance, and runtime/post-runtime monitoring, can be achieved due to the unique way in which data is structured and processed in implementations constructed and/or operating in accordance with the teachings herein.

Thus, employing the teachings herein enables construction of unique case creation pipelines for specific security events with simple expression and that ensures compatibility of pipeline components.

Employing the teachings herein can further enable inspection and analysis of running/complete case creation pipelines via task telemetry processing. This is because a Task Log 120 is created by a running pipeline every time a new task is encountered in the sequential execution of its tasks. The Task Log 120 is created and stored externally before calling the task's main( ) function. This ensures that a record of the task is logged before any errors can occur, along with retention, either in memory or storage, depending upon the implementation. The Task Logs 120 can advantageously optionally also be parsed and displayed in order to provide a detailed view into the status and progress of a running pipeline. The Task Log 120 can also optionally, but advantageously, be analyzed to evaluate what happened in a completed pipeline. In addition, a pipeline is known to have been completed if, for example, it has created a number of Task Logs 120 equal to its number of tasks. Alternatively, or additionally, optionally a sink task can be configured to send a notification or other information to identify that a pipeline has completed.

Employing the teachings herein can also enable inspection and replay of failed case creation pipelines at the point of failure with preservation of the failed task(s)' input.

Employing the teachings herein can also enable the automatic continuation of a pipeline's execution after a failure when the next subsequent task's input is compatible with the previous task's output.

Employing the teachings herein can further enable streamlined testing and development of pipelines with sample data through the modification or replacement of source and/or sink tasks. For example, for purposes of development and/or testing of pipelines, with our approach, it is advantageously possible to replace a pipeline's source and sink tasks with alternatives which read in data locally and/or output data locally. In this manner control of the specific input data is possible.

Employing the teachings herein can provide further advantages resulting from the ability to easily and efficiently insert one or more tasks into the pipeline, remove one or more tasks from the pipeline and/or change the order of tasks in the pipeline. Some such advantage examples resulting from this is the enablement of granular testing and/or making development easier.

The foregoing advantages can be achieved because, with conventional systems, when an error is encountered while creating cases for a SIEM platform, the state of the data at the point of failure is likely lost. In contrast, implementations of systems and methods employing the teachings herein preserve the data upon failure for re-instantiation or later inspection.

With some implementations of systems and methods employing the teachings herein, the interoperability of pipeline tasks enables the conditional omission of a failed task when desired, to ensure timely delivery of SIEM cases without intervention, reducing downtime.

Moreover, a byproduct of some implementations of systems and methods employing the teachings herein, is that thorough error analysis, including error reproduction, is made possible due to the framework built around pipeline task execution.

Still further, pipeline task logging in implementations of systems and methods employing the teachings herein enables thorough analysis of running and completed pipelines by an external process, without the need to interact with the pipeline process directly. Monitoring is simplified due to the ability to analyze both in-progress and completed pipelines using an identical approach.

Finally, implementations of systems and methods employing the teachings herein, removes the overhead associated with ad-hoc case creation flows by defining reusable, malleable, and chainable tasks, and, in some implementations, maintaining a library of such tasks.

The foregoing outlines, generally, the features and technical advantages of one or more implementations that can be constructed based upon the teachings in this disclosure in order that the following detailed description may be better understood. However, the advantages and features described herein are only a few of the many advantages and features available from representative examples of possible variant implementations and are presented only to assist in understanding. It should be understood that they are not to be considered limitations on the invention as defined by the appended claims, or limitations on equivalents to the claims. For instance, some of the advantages or aspects of different variants are mutually contradictory, in that they cannot be simultaneously present in a single embodiment. Similarly, some features or advantages may be applicable to one aspect and inapplicable to others. Thus, the foregoing features and advantages should not be considered dispositive in determining equivalence. Additional features and advantages, although not detailed herein, will be apparent from the teachings of the description, drawings, and claims.

What is claimed is:

1. A system for improving efficiency of processing alerts by a Security Incident & Event Management (SIEM) platform, the system comprising:
 a pipeline coupled to a source of alerts and an SIEM platform, the pipeline including
 a source task having an input through which it can receive alerts from the source of alerts and an output;
 at least one process task having an input and an output, wherein the input is coupled to the output of the source task;
 at least one sink task having an input, coupled to the output of the at least one process task, and an output coupled to the SIEM platform, wherein the at least one sink task is configured to publish cases to the SIEM platform when a count of cases is less than or equal to a count of alerts received by a preceding task;

wherein the at least one process task is configured to operate on alerts received via its input and wherein the at least one process task is configured to be skippable in the event an exception occurs in the at least one process task when the at least one process task is operating on at least one alert received via its input.

2. The system of claim 1, wherein the at least one process task comprises at least two serially-coupled process tasks such that a first of the at least two serially-coupled process tasks receives alerts output by the source task as its input, and wherein the first of the at least two serially-coupled process tasks has an output coupled to an input of a second of the at least two serially-coupled process tasks.

3. The system of claim 2, wherein the system is configured to, in the event an exception occurs in the first of the at least two serially-coupled process tasks, create an error log for the first of the at least two serially-coupled process tasks and, wherein if the first of the at least two serially-coupled process tasks is configured to be skippable, provide to the second of the at least two serially-coupled process tasks, as input, data that had been provided to the input of first of the at least two serially-coupled process tasks.

4. The system of claim 2, wherein the system is configured to, in the event an exception occurs in the second of the at least two serially-coupled process tasks, create an error log for the second of the at least two serially-coupled process tasks and, wherein if the second of the at least two serially-coupled process tasks is configured to be skippable, provide as input, to a next task in pipeline, data that had been provided to the input of second of the at least two serially-coupled process tasks.

5. The system of claim 1, wherein the pipeline is one of at least two pipelines.

6. The system of claim 5, wherein a process task in a first of the at least two pipelines operates on alerts differently from any process task in a second of the at least two pipelines.

7. The system of claim 1, wherein the at least one process task is configured to group alerts received at its input into at least one SIEM case.

8. The system of claim 1, further comprising a task log configured to store information about the at least one process task immediately prior to when the at least one process task begins to operate on the alerts received via its input.

9. The system of claim 8, wherein the system is further configured to retain a copy of the alerts received by the at least one process task to operate on, at least until the at least one process task successfully completes its operation on the alerts it received.

10. The system of claim 9, wherein the system is further configured to retain the copy of the alerts in memory.

11. The system of claim 9, wherein the system is further configured to retain the copy of the alerts in non-transient storage.

12. The system of claim 1, wherein the system is further configured to retain a copy of all SIEM cases received by the at least one sink task, at least until the at least one sink task successfully completes its operation on the SIEM cases it received.

13. The system of claim 1, wherein the system is configured to, in the event an exception occurs in the at least one sink task, create an error log for the at least one sink task.

14. A method of improving efficiency of processing alerts by a Security Incident & Event Management (SIEM) platform using a case creation platform, the method comprising:
   executing a source task in a pipeline so that it retrieves alerts from a source of alerts;
   providing an output of the source task to a first of at least two process tasks in the pipeline;
   processing the output of the source task, using the first of the at least two process tasks and output first processed alerts to a second of the at least two process tasks;
   processing the first processed alerts with the second of the at least two process tasks such that
   when the second of the at least two process tasks completes, an output of the second of the at least two process tasks will be provided to a sink task for publication as one or more SIEM cases to the SIEM platform; and
   when the second of the at least two process tasks fails due to an exception, if the second of the at least two process tasks is skippable, the first processed alerts will be automatically provided to a next task following the second of the at least two process tasks, and at least one object will be stored in an error log relating to the failure; and
   when the second of the at least two process tasks fails due to the exception, but the second of the at least two process tasks is not skippable, (i) at least one object will be stored in an error log relating to the failure, (ii) associated data will be stored in the task log, and (iii) a notification will be issued regarding the failure, such that a mock out of at least a portion of the pipeline can occur.

15. The method of claim 14, wherein when the second of the at least two process tasks fails and the second of the at least two process tasks is not skippable, the method further comprises:
   mocking out the pipeline using contents from the error log and task log.

16. The method of claim 14 further comprising, upon the exception occurring, storing state information relating to the exception in an error log.

17. The method of claim 16 further comprising, following the storing of the state information:
   re-running at least a portion of the pipeline within an offline environment.

18. The method of claim 14 further comprising:
   using the error log to inspect for an error and automatically remediate the error.

19. The method of claim 14 further comprising:
   using the error log to replay a process that was not competed due to an error.

20. The method of claim 14 further comprising:
   using the error log to modify and/or swap an ordering of the at least two process tasks.

21. The method of claim 14, wherein when the second of the at least two process tasks fails and the second of the at least two process tasks is skippable, the method further comprises:
   following completion of the pipeline, mocking out at least a portion of the pipeline using contents from the error log and task log.

* * * * *